United States Patent
Boisset et al.

(10) Patent No.: US 11,787,243 B2
(45) Date of Patent: Oct. 17, 2023

(54) ELECTRONIC UNIT FOR MEASURING OPERATING PARAMETERS OF A VEHICLE WHEEL AND SUITABLE FOR BEING POSITIONED ON THE INNER SURFACE OF A TREAD OF A TIRE

(71) Applicants: Continental Automotive France, Toulouse (FR); Continental Automotive GmbH, Hannover (DE)

(72) Inventors: Jean-Philippe Boisset, Montauban (FR); Joachim Busche, Sarstedt (DE); Andrei Cimponeriu, Timisoara (RO); Parthiv Dharamshi, Regensburg (DE); Florin Mihai Cristea, Varias (RO)

(73) Assignees: CONTINENTAL AUTOMOTIVE FRANCE, Toulouse (FR); CONTINENTAL AUTOMOTIVE GMBH, Hannover (DE)

( * ) Notice: Subject to any disclaimer, the term of this patent is extended or adjusted under 35 U.S.C. 154(b) by 154 days.

(21) Appl. No.: 16/959,498

(22) PCT Filed: Jan. 22, 2019

(86) PCT No.: PCT/FR2019/050130
§ 371 (c)(1),
(2) Date: Jul. 1, 2020

(87) PCT Pub. No.: WO2019/150016
PCT Pub. Date: Aug. 8, 2019

(65) Prior Publication Data
US 2021/0053402 A1 Feb. 25, 2021

(30) Foreign Application Priority Data
Jan. 30, 2018 (FR) .................................. 1850722

(51) Int. Cl.
*B60C 23/04* (2006.01)
*B29D 30/00* (2006.01)
*G01M 17/02* (2006.01)

(52) U.S. Cl.
CPC ...... *B60C 23/0493* (2013.01); *B29D 30/0061* (2013.01); *G01M 17/02* (2013.01); *B29D 2030/0083* (2013.01)

(58) Field of Classification Search
CPC . B60C 23/0493; B60C 23/04; B60C 23/0433; B60C 23/0435; B60C 23/0416;
(Continued)

(56) References Cited

U.S. PATENT DOCUMENTS

| 6,759,952 B2 * | 7/2004 | Dunbridge | ............ G01M 17/02 340/440 |
| 7,009,506 B2 * | 3/2006 | Wilson | ................ B60C 23/0493 340/693.12 |

(Continued)

FOREIGN PATENT DOCUMENTS

| CN | 1699084 A | 11/2005 |
| CN | 101460321 A | 6/2009 |
| CN | 103888022 A | 6/2014 |

OTHER PUBLICATIONS

International Search Report and Written Opinion for International Application No. PCT/FR2019/050130, dated Apr. 9, 2019, with partial translation, 7 pages.

(Continued)

*Primary Examiner* — Harshad R Patel
*Assistant Examiner* — Gedeon M Kidanu
(74) *Attorney, Agent, or Firm* — RatnerPrestia

(57) ABSTRACT

An electronic unit suitable for being positioned on an internal face of a tread of a tire with a view to measuring operating parameters of a vehicle wheel equipped with the
(Continued)

tire. The electronic unit includes: a body, configured to be embedded into the thickness of the tire, in a housing provided for this purpose, and includes sensors dedicated to measuring operating parameters of the wheel, a head, arranged at one end of the body, including a circuit board for managing information output from the sensors of the body and a way of communicating with a central unit installed in the vehicle; a way for connecting the elements with which the body is equipped and the elements with which the head is equipped; and a way to supply the electronic unit with power.

12 Claims, 1 Drawing Sheet

(58) Field of Classification Search
CPC ............ B60C 23/0489; B60C 23/0488; B60C 23/0415; B60C 23/0447; B60C 23/0494; B60C 23/062; B60C 23/0457; B60C 23/0459; B60C 23/0466; B60C 23/0471; B60C 23/0486; B60C 23/0408; B60C 23/20; B60C 11/24; B60C 23/0401; B60C 11/246; B60C 23/001; B60C 23/003; B60C 23/007; B60C 23/008; B60C 23/009; B60C 23/02; B60C 23/041; B60C 23/0413; B60C 23/0423; B60C 23/0461; B60C 23/0496; B60C 23/0498; B60C 23/061; B29D 2030/0072; B29D 2030/0077; G01K 1/024; B60G 2800/984; B60T 2240/06; B60T 2240/07; B60T 2240/08; E01F 9/696; F16D 2066/001; G01L 17/00; G01L 17/005; G01L 19/0092; G01L 19/08; G01L 19/083; G01L 19/086; G01L 5/28; G01L 7/166; G01B 11/22; G01B 2210/50; G01B 5/18; G01M 17/02; G01M 17/027; G01M 17/013; G02F 1/31; G02F 2203/12; H02S 10/12; H02S 20/21; H02S 20/22
See application file for complete search history.

(56) References Cited

U.S. PATENT DOCUMENTS

| | | | |
|---|---|---|---|
| 7,009,508 B2 | 3/2006 | Wilson et al. | |
| 8,742,915 B2* | 6/2014 | Vassilieff | B60C 23/0408 |
| | | | 340/447 |
| 9,632,106 B2* | 4/2017 | Guinart | B60C 23/0459 |
| 9,884,526 B2* | 2/2018 | Kempf | B60C 29/02 |
| 9,891,045 B2* | 2/2018 | Vassilieff | B60C 23/0494 |
| 10,071,605 B1* | 9/2018 | Liang | B60C 23/0462 |
| 2004/0118196 A1* | 6/2004 | Landes | B60C 23/0493 |
| | | | 73/146 |
| 2004/0211250 A1 | 10/2004 | Adamson et al. | |
| 2005/0044943 A1* | 3/2005 | Godeau | G01N 3/56 |
| | | | 73/146 |
| 2006/0048567 A1* | 3/2006 | Shimura | B60C 23/0413 |
| | | | 73/146.5 |
| 2006/0130570 A1* | 6/2006 | Anders | B60C 23/0488 |
| | | | 73/146 |
| 2007/0256485 A1 | 11/2007 | Rensel et al. | |
| 2012/0112898 A1* | 5/2012 | Yu | B60C 23/0493 |
| | | | 340/442 |
| 2012/0291537 A1* | 11/2012 | Honda | B60C 23/0447 |
| | | | 73/146 |
| 2017/0008355 A1* | 1/2017 | Lange | B60C 23/0433 |
| 2019/0234790 A1* | 8/2019 | Sherlock | B60C 23/0474 |

OTHER PUBLICATIONS

International Search Report and Written Opinion for International Application No. PCT/FR2019/050130, dated Apr. 9, 2019, 11 pages (French).
Chinese Office Action for Chinese Application No. 201980010793. 6, dated Nov. 30, 2021 with translation, 13 pages,.
Chinese Decision of Rejection for Chinese Application No. 201980010793.6, dated Aug. 24, 2022 with translation, 10 pages.

* cited by examiner

ELECTRONIC UNIT FOR MEASURING OPERATING PARAMETERS OF A VEHICLE WHEEL AND SUITABLE FOR BEING POSITIONED ON THE INNER SURFACE OF A TREAD OF A TIRE

CROSS REFERENCE TO RELATED APPLICATIONS

This application is the U.S. National Phase Application of PCT International Application No. PCT/FR2019/050130, filed Jan. 22, 2019, which claims priority to French Patent Application No. 1850722, filed Jan. 30, 2018, the contents of such applications being incorporated by reference herein.

FIELD OF THE INVENTION

The present invention relates to an electronic unit suitable for being positioned on the internal face of a tread of a tire with a view to measuring operating parameters of a vehicle wheel equipped with said tire.

BACKGROUND OF THE INVENTION

Motor vehicles are increasingly being fitted with systems for monitoring and/or measuring operating parameters of a vehicle wheel, these systems comprising sensors.

By way of example of such systems, mention may be made of tire pressure monitoring systems (TPMS), which comprise electronic modules mounted on each of the vehicle wheels, these being dedicated to measuring parameters, such as the pressure and/or temperature of the tires with which these wheels are equipped, and intended to inform the driver of any abnormal variation in the measured parameter.

Conventionally, these electronic units are securely fastened to the rims of the wheels, and the solutions employed to ensure they are thus fastened consist either of fastening them directly to the rims, or of inserting them into cradles themselves fastened to the rims, or of integrating them into inflation valve systems fastened to these rims.

It has however become apparent that it could be advantageous to associate these electronic units not with the rims but with the tires, and more particularly to position them on the internal face of the tread of said tires. The solution adopted to ensure the electronic units are held in place then consists of inserting them into a supple receptacle that is adhesively bonded to the internal face of the tread of the tire and made of an elastic material able to form a "pocket" of retentive shape in which the electronic unit is imprisoned.

Such a solution ensures that these electronic units are held in place well; however, in contrast, it has become apparent that present-day electronic units are not designed to satisfactorily meet, and in particular without needing to be excessively over-dimensioned, the stresses engendered by this position. Specifically, the contact of the segment of tire on which the electronic unit is mounted with the roadway causes said electronic unit to be repeatedly shocked, and the acceleration to which it is subjected is such that it may become unfastened from the internal face of the tire and in particular damage the internal wall of said tire, this possibly proving to be dangerous.

SUMMARY OF THE INVENTION

The present invention aims to mitigate these drawbacks and its main aspect is an electronic unit the design of which is enables it to optimally resist the stresses resulting from positioning said electronic unit on the internal face of the tread of a tire.

Another aspect of the invention is an electronic unit the securement of which to the internal face of the tread is easily maneuverable by means of a simple ordinary tool.

To this end, the an aspect of present invention relates to an electronic unit suitable for being positioned on an internal face of a tread of a tire with a view to measuring operating parameters of a vehicle wheel equipped with said tire, this electronic unit being noteworthy in that:

a body, configured to be embedded into the thickness of said tire, in a housing provided for this purpose, and comprising sensors dedicated to measuring operating parameters of the wheel such as the radial acceleration of the wheel, and the pressure and temperature of the tire with which this wheel is equipped;

a head, arranged at one end of the body so as to be positioned against the internal face of the tread of the tire and comprising a circuit board for managing information output from the sensors of said body and means for communicating with a central unit installed in the vehicle;

means for connecting the elements with which said body is equipped and the elements with which said head is equipped; and a means for supplying the electronic unit with power.

The electronic unit according to an aspect of the invention affords a number of beneficial advantages, such as:

a better mechanical strength, and in particular a better pull-out strength, and easy installation with simple tools.

According to one example of an advantageous embodiment, the means for supplying power is an energy-harvesting device located in the body of the electronic unit.

According to one example of implementation, the means for connecting the elements with which the head is equipped and the elements with which the body is equipped consist of a wireless connection.

According to one example of implementation, the means for connecting the elements with which the head is equipped and the elements with which the body is equipped consist of a wired connection, a face of the head located facing the end of the body to which it is coupled then comprising connection pads.

According to a first example of an embodiment, the body is produced by overmolding and is extended, at one of its ends, by a receptacle made from an elastic material, able to form a chamber of retentive shape, and the head consists of a casing able to be housed in said chamber.

According to another example of an embodiment, the body and head form a single piece.

According to one example of an embodiment, a base is provided between the head and the body so as to create an additional area for abutment against the internal face of the tread of the tire.

According to one advantageous embodiment, the underside of the base, which is intended to make contact with the internal face of the tread of the tire, is configured to be adhesively bonded to said internal face, thus procuring a more robust securement and a better seal-tightness for the tire.

An aspect of the present invention also relates to a tire comprising a housing that opens at least onto an internal face of the tread of said tire and that is configured to receive an electronic unit having any one of the aforementioned features.

An aspect of the present invention also relates to a motor-vehicle tire comprising a rim on which is mounted a tire according to an aspect of the invention equipped with an electronic unit according to an aspect of the invention.

An aspect of the present invention also relates to a motor vehicle comprising at least one wheel according to an aspect of the invention.

BRIEF DESCRIPTION OF THE DRAWINGS

Other aspects, features and advantages of the present invention will become apparent from the following description, provided by way of a non-limiting example, with reference to the appended drawings, in which.

DETAILED DESCRIPTION OF THE PREFERRED EMBODIMENTS

In the present description, the terms "near" and "far" are used with reference to the positions of the constituent elements of the electronic unit according to an aspect of the present invention.

The electronic unit 1 according to an aspect of the invention is intended to be mounted on an internal face Fi of a tread of a tire P with a view to measuring operating parameters (pressure, temperature, acceleration, etc.) of a vehicle wheel equipped with said tire, and to transmitting the measured data to a central unit (not shown) installed in the vehicle.

Figure 1:
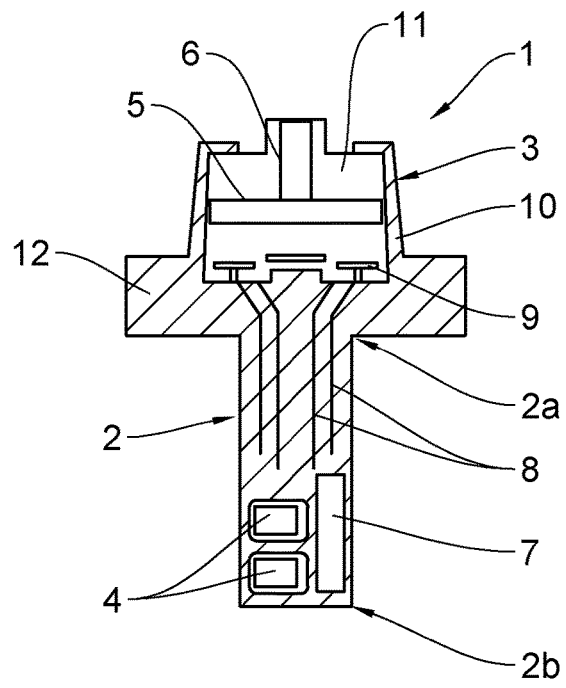
FIG. 1 is a cross-sectional view of schematic nature of an example of an embodiment of the electronic unit according to an aspect of the invention.
Figure 2:
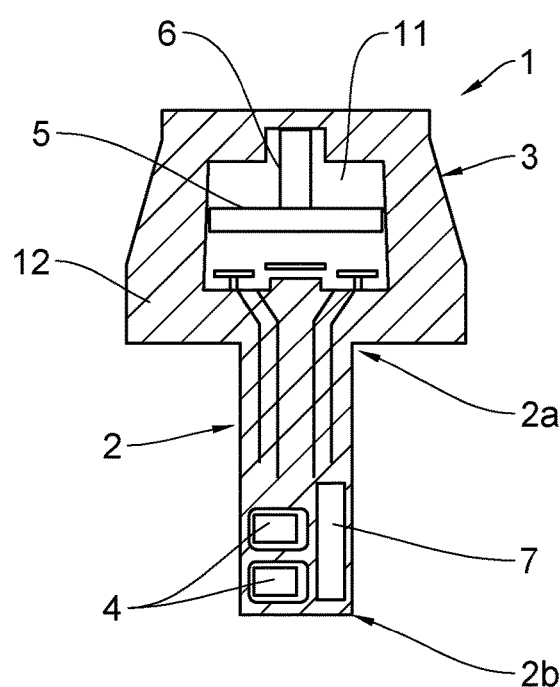
FIG. 2 is a cross-sectional view of schematic nature of another example of an embodiment of the electronic unit according to an aspect of the invention.
Figure 3:
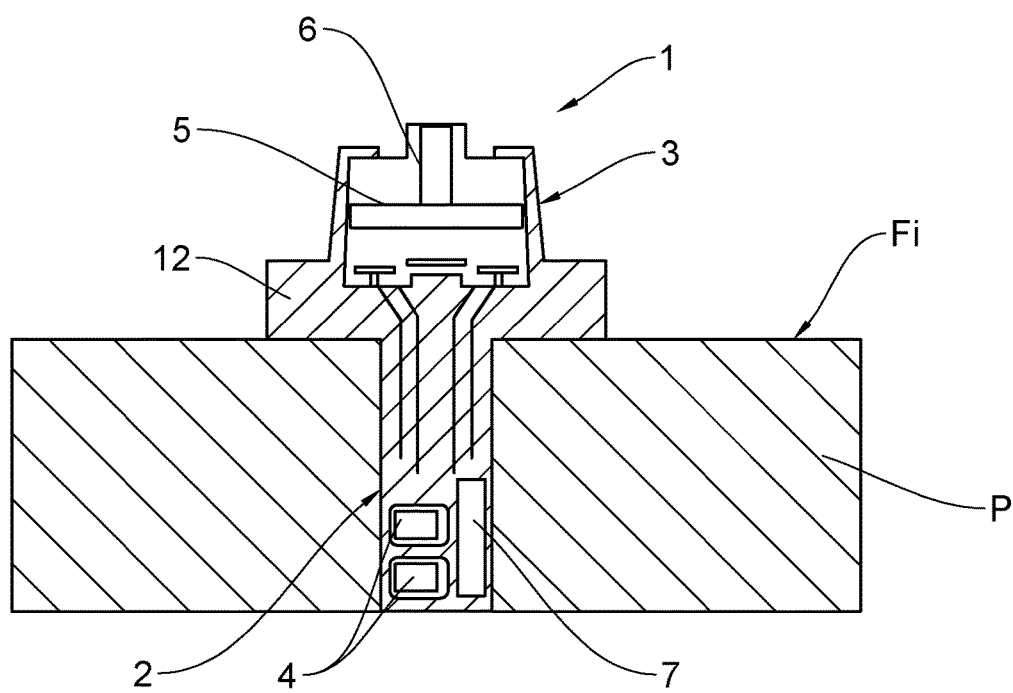
FIG. 3 is a cross-sectional view of schematic nature illustrating the electronic unit shown in FIG. 1 mounted on the internal face of the tread of a tire.

With reference to FIGS. 1 to 3, this electronic unit 1 comprises a body 2 and a head 3.

The body 2 for example consists of a cylinder enclosing sensors 4 dedicated to measuring operating parameters of the wheel, such as, for example, a radial-acceleration sensor, a pressure sensor and a temperature sensor.

As illustrated in FIG. 3, the body is configured to be embedded into the thickness of the tire P, in a housing that opens at least onto the internal face Fi of the tread of said tire P and that is configured to receive the electronic unit 1 according to an aspect of the invention. This housing may either be a blind housing, or a through-housing as shown in FIG. 3.

One end of the body 2 of said near end 2a is configured to arrange the head 3 so that the latter is positioned against the internal face Fi of the tread of the tire P. The other end of the body 2, which is called the far end 2b, is free.

The head 3 comprises a circuit board 5 for managing data output from the sensors 4 and means for communicating with the central unit installed in the vehicle, and for example comprising a microprocessor and a memory. According to one completely non-limiting example of an embodiment, the means for communicating with the central unit installed in the vehicle is a radiofrequency transmitter 6, the central unit of the vehicle then incorporating a radiofrequency receiver connected to an antenna. However, any type of wireless communicating means may be envisioned, whether they be for one-way or two-way communication between the electronic unit 1 and the central unit of the vehicle.

The electronic unit 1 also comprises a means for supplying power.

According to one example (not shown) it is a question of a battery, for example a button cell, placed in the head 3.

Preferably and advantageously, the means for supplying power is an energy-harvesting device 7 located in the body 2. For example, the energy-harvesting device 7 is a piezoelectric element placed in a segment close to the far end 2b of the body 2 so as to be as close as possible to the region of contact with the road in order that the vibrations and shocks generated when the segment of tire on which the electronic unit 1 is mounted makes contact with the road (this contact being known as the footprint) generate a voltage. The voltage thus generated by the piezoelectric element may then either supply the various elements of the electronic unit 1 directly (sensors 4 in the body, circuit board 5 in the head 2), or recharge a battery with which the electronic unit 1 is equipped.

Means 8 allowing the elements with which the body 2 is equipped (namely the sensors 4, the energy-harvesting device 7) and the elements with which the head 3 is equipped (the circuit board 5, the battery) to be connected are provided. These means are of wireless or wired type and allow, either data to be transmitted from the sensors 4 to the circuit board 5, or energy to be transmitted from the energy-harvesting device 7 to the circuit board 5 and optional battery located in the head 3. Provision is also made to transmit energy from the energy-harvesting device 7 to the sensors 4, via suitable connecting means.

In the embodiment in which the means 8 for connecting the elements with which the body 2 is equipped and the elements with which the head 3 is equipped consist of a wired connection, a face of the head located facing the near end 2a of the body 2, to which end said face is coupled, comprises connection pads 9, the wired connection to the pads 9 then being achieved either by soldering, or using a conductive adhesive.

According to a first example of an embodiment, illustrated in FIG. 1, the body 2 is produced by overmolding and is extended, at its near end 2a, by a receptacle 10 made from an elastic material, able to form a chamber of retentive shape, and the head 3 consists of a casing 11 able to be housed in said chamber formed by the receptacle 10. Thus, when the connection between the sensors 4 of the body 2 and the managing circuit board 5 is of wireless type, and when the means for supplying power is a battery placed in the head 3, it is possible to be able to dissociate the body 2 and the head 3. Thus, if one of these two elements is faulty, it is possible to change it without needing to replace the other of these elements.

According to another example of an embodiment, illustrated in FIG. 2, the body 2 and the head 3 form a single piece, for example produced by overmolding.

Advantageously, a base 12 is provided between the head 3 and the body 2 so as to create an additional area for abutment against the internal face Fi of the tread of the tire P. The underside of the base 12, which is intended to make contact with the internal face Fi of the tread of the tire P, is configured to be adhesively bonded to said internal face Fi, thus procuring a more robust securement of the electronic unit 1 to the tire P and therefore a better pull-out strength for the electronic unit 1 in an environment in which the shocks to which it is subjected when the vehicle is being driven are powerful, and also ensuring a better seal-tightness for said tire P, in particular when the housing produced in the thickness of the tire and intended to receive the body 2 is a through-housing.

Since the electronic unit 1 according to an aspect of the invention is simply inserted by force into the housing provided in the thickness of the tire 3, its installation does not require any complex specific tools.

An aspect of the present invention therefore relates to an electronic unit produced so as to have any one of the aforementioned claims. It also relates to a tire P configured to receive such an electronic unit 1, to a vehicle wheel comprising a rim on which is mounted such a tire P and to a motor vehicle comprising at least one wheel equipped with such a tire P.

The invention claimed is:

1. An electronic unit suitable for being positioned on an internal face of a tread of a tire with a view to measuring operating parameters of a vehicle wheel equipped with said tire, comprising:
    a body, configured to be embedded into the thickness of said tire, in a housing provided for this purpose, and comprising sensors dedicated to measuring operating parameters of the wheel including radial acceleration of the wheel, and pressure and temperature of the tire with which this wheel is equipped,
    a head, arranged at one end of the body so as to be positioned against the internal face of the tread of the tire and comprising a circuit board for managing information output from the sensors of said body and means for communicating with a central unit installed in the vehicle;
    means for connecting elements with which said body is equipped and elements with which said head is equipped; and
    a means for supplying the electronic unit with power,
    wherein the body is produced by overmolding and is extended, at one of its ends, by a receptacle made from an elastic material, able to form a chamber of retentive shape, and the head comprises a casing able to be removably housed in said chamber, such that the head can be removed from the body.

2. The electronic unit as claimed in claim 1, wherein the means for supplying power is an energy-harvesting device located in the body.

3. The electronic unit as claimed in claim 2, wherein the means for connecting the elements with which the head is equipped and the elements with which the body is equipped comprises a wireless connection.

4. The electronic unit as claimed in claim 2, wherein the means for connecting the elements with which the head is equipped and the elements with which the body is equipped comprises a wired connection, a face of the head located facing the end of the body to which it is coupled then comprising connection pads.

5. The electronic unit as claimed in claim 1, wherein the means for connecting the elements with which the head is equipped and the elements with which the body is equipped comprises of a wireless connection.

6. The electronic unit as claimed in claim 1, wherein the means for connecting the elements with which the head is equipped and the elements with which the body is equipped comprises a wired connection, a face of the head located facing the end of the body to which it is coupled then comprising connection pads.

7. The electronic unit as claimed in claim 1, wherein a portion of the body that is configured to be embedded into the thickness of said tire is formed as a single piece with the head by overmolding.

8. The electronic unit as claimed in claim 1, wherein a base is provided between the head and the body so as to create an additional area for abutment against the internal face of the tread of the tire (P).

9. The electronic unit as claimed in claim 8, wherein an underside of the base, which is intended to make contact with the internal face of the tread of the tire, is configured to be adhesively bonded to said internal face.

10. A tire, comprising a housing that opens at least onto an internal face of the tread of said tire and that is configured to receive an electronic unit as claimed in claim 1.

11. A motor-vehicle wheel, comprising a rim on which a tire as claimed in claim 10 is mounted.

12. A motor vehicle, comprising at least one wheel as claimed in claim 11.

* * * * *